United States Patent [19]

Ludwig et al.

[11] Patent Number: 4,768,895
[45] Date of Patent: Sep. 6, 1988

[54] CAPTIVE BALL AND SOCKET JOINT

[75] Inventors: George C. Ludwig, Marion; Alexander J. Craig, Jr., Rock Hill, both of S.C.

[73] Assignee: AVM, Inc., Marion, S.C.

[21] Appl. No.: 59,760

[22] Filed: Jun. 8, 1987

[51] Int. Cl.[4] .............................................. F16C 11/00
[52] U.S. Cl. ....................................... 403/77; 403/19; 403/122
[58] Field of Search .................... 403/70, 76, 77, 115, 403/122, 123, 19

[56] References Cited

U.S. PATENT DOCUMENTS

| 410,570 | 9/1889 | Arnold | 403/125 |
|---|---|---|---|
| 844,421 | 2/1907 | Stafford | 411/370 |
| 1,265,445 | 5/1918 | Hagen | 403/125 |
| 1,293,374 | 2/1919 | Dodds | 411/374 |
| 2,513,637 | 7/1950 | Herreshoff et al. | 403/122 |
| 2,601,875 | 7/1952 | Dardani | 139/151 |
| 2,854,266 | 9/1958 | Dies | 403/122 |
| 3,097,005 | 7/1963 | Fickler | 403/6 |
| 4,367,968 | 1/1983 | Ishida | 403/122 |
| 4,645,370 | 2/1987 | Kassai | 403/122 X |

*Primary Examiner*—Andrew V. Kundrat
*Attorney, Agent, or Firm*—Nies, Webner, Kurz & Bergert

[57] ABSTRACT

A captive ball in a socket joint made with a minimum number of units capable of mass production and readily assembled with minimum labor. The ball and socket structure enables easy connection of the ball component to a machine element via open access to the ball component for a power driven tool, such as a pneumatic, rotary driver. The socket unit is a single unitary lug-shaped stamping made from flat sheet metal in which a socket recess with a spherical bottom is stamped or formed with a slotted aperture therethrough. The ball unit is a single unitary screw the head of which is ball-shaped and includes an integral drive device in the ball head. The screw-threaded shank of the ball unit projects through the socket unit aperture with the ball-head received in the socket recess. The slotted aperture permits universal swiveling movement of the ball unit relative to the socket unit. A nut, on the ball unit renders the ball unit captive in the socket unit. The nut is retained in the desired position by conventional cement, lock thread formation or other well known self locking screw and nut structure.

18 Claims, 1 Drawing Sheet

CAPTIVE BALL AND SOCKET JOINT

BACKGROUND OF THE INVENTION

This invention relates to a captive ball and socket joint which is used to movably connect two machine elements in a universal manner. Such machine elements can be links, levers, and fixed elements such as brackets. This invention was developed and will be described in connection with automotive link components, namely counterbalance links such as gas springs, the two ends of which are connected to and provide a linkage between two relatively movable components of the automobile, e.g., the trunk and trunk closure lid. The connection joints are sometimes ordinary pivotal joints but it is becoming more preferable to use ball and socket joints which permit a universally movable pivot connection between the two ends of a gas spring and the automotive elements when the link or gas spring is not mounted perpendicular to the closure lid hinge center line, thereby necessitating an attachment with omnidirectional capability. Components such as gas springs are usually furnished for installation with part of the end connections, usually an apertured lug or a socket, welded or prefastened to the ends of the gas spring. When the spring link is installed, the support part of the joint is normally fastened to the automobile body or a bracket on the trunk or hatch lid. When the spring link is installed with sockets to be mated with a ball, some form of clip or separate fastening device is then installed and holds the ball and socket together. It is desirable that the element, e.g., spring link, be preassembled with complete ball and socket end joints, the ball component being held captive in the socket component so they will not become separated. The worker then merely has to place the ball component in the desired location on the automobile component and secure it in place.

Ball and socket joints have been proposed in which, when assembled, the ball component is retained captive in the socket but either the ball component or the socket component or both components are each made from multiple elements which require multiple parts to be assembled to result in the captive ball in socket joint.

SUMMARY OF THE INVENTION

The inventive captive ball in a socket joint is made with a minimum number of basic units which can be mass produced, and readily assembled with a minimum amount of labor steps, saving time and cost in both production and assembly. Moreover, the ball and socket structure is so arranged to permit rapid connection of the ball component to a machine element because of clear and open access to the ball component for a power driven tool, such as a pneumatic, rotary driver. The socket unit is a single, unitary, lug-shaped stamping made from flat sheet metal in which a socket recess with a spherical bottom is stamped or formed with a slotted aperture therethrough. The ball unit is a single unitary screw the head of which is ball-shaped and includes an integral drive device in the head. The screw-threaded shank of the ball unit is inserted through the socket lug aperture so the ball-shaped head is received in the socket recess, and the slotted aperture permits universal swiveling movement of the ball unit relative to the socket unit. A nut, screwed on the ball unit threaded shank to a position spaced from the lug renders the ball unit captive in the socket unit. The nut is retained in the desired position by conventional means such as cement, lock thread formation or other well known self locking screw and nut construction.

The socket lug can be secured by welding, threaded portions or other attachment devices to whatever machine element, e.g., levers, links and other structures, are being assembled with a captive ball and socket end connector joint. The ball unit and its locking nut can be assembled to the socket unit before or after the socket lug is secured to its machine element.

Various examples of ball and socket joints are seen in the following U.S. Pat. Nos. 2,513,637 to A. G. Herreshoff et al and 2,854,266 to H. F. Dies are two examples of many ball and socket joints with supplemental sheet metal clips retaining the ball unit in a socket lug; U.S. Pat. Nos. 2,601,875 to E. V. Dardani and 3,097,005 to H. Fickler show examples of ball and socket joints where the socket unit is assembled from at least two joined sheet metal parts and the ball and stud are made from either one or two separate parts; U.S. Pat. Nos. 844,421 to B. E. D. Stafford and 1,293,374 to E. I. Dodds are early examples of captive ball and socket joints wherein a separate retaining plug in the socket portion holds the ball unit in place, the ball unit having a screw driver kerf in the ball head of a stud; and U.S. Pat. Nos. 410,570 to S. Arnold and 1,265,445 to J. J. Hagen are examples of single piece socket unit and a single piece ball unit on a screw shank. The latter are the closest prior art but both have molded or machined socket units, neither one teaches the concept of a single unitary socket unit stamped from flat sheet metal.

The present invention has for a primary object the provision of a ball and socket joint in which the socket is a single unitary piece made from a piece of flat sheet metal, the ball and its attachment stud or shank is received in the socket unit and can be held captive therein by a member secured on the ball stud below the socket unit after the ball unit is placed into the socket.

Other novel features reside in the provision in the aforementioned ball and socket joint of the socket unit being in the form of a lug stamped from flat sheet metal with a socket forming recess formed to extend from one side of the lug and having a cylindrical wall and spherical bottom, the bottom being pierced with a slotted aperture, enabling the stud portion of the ball unit to project therethrough with the ball portion seated in the socket recess below the top face of the socket lug. Furthermore the ball unit stud may be screw threaded and made to receive a nut to render the ball unit captive in the socket lug. The nut may be rendered rigid in its desired location on the ball stud by suitable so-called nut locking adhesives or structure. The positioning of the nut can predetermine the extent of swivel or universal joint movement between the ball and socket units.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

GENERAL DESCRIPTION

Figure 2:
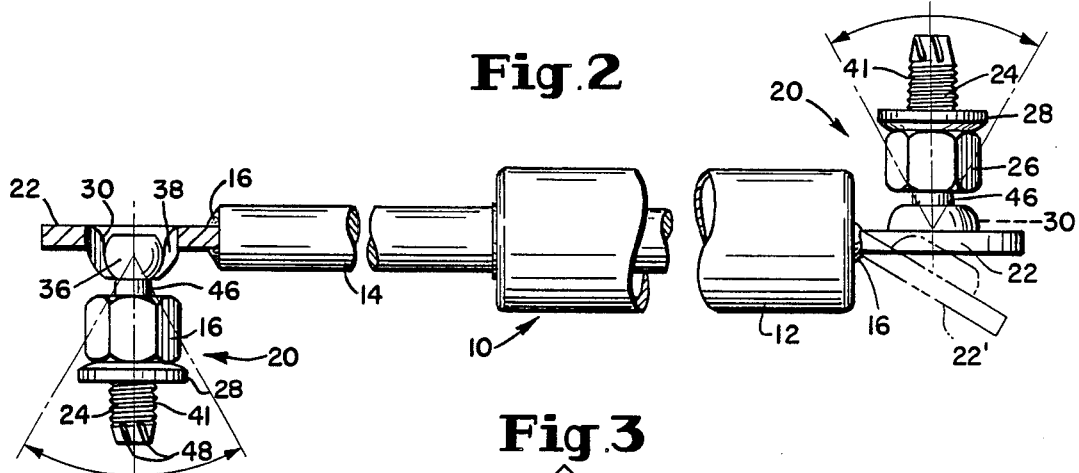
FIG. 2 is a side view, partially in section, of the spring link in FIG. 1 and shows a complete captive ball and socket joint, in accord with the present invention, secured on each end of the spring link.

A preferred complete assembly of the captive ball and socket joint herein described is shown used as the connectors at both ends of the machine element seen in FIG. 2, and details of the units of the ball and socket joint are described relative to FIGS. 3-6.

Figure 1:
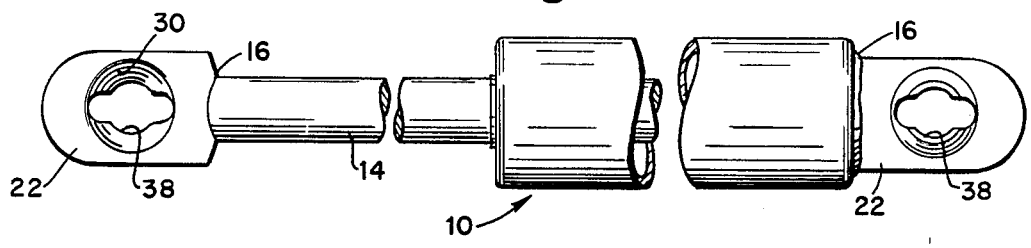
FIG. 1 is a plan view of a gas spring counterbalance link with a socket unit, in accord with the present invention, secured to the shaft end and to the cylinder end of the link as by welding.

The gas spring link 10, generally depicted in FIGS. 1 and 2, is shown as an example of a machine element to which the ball and socket connector joint can be attached. The gas spring 10 is a link which can be extended and retracted and includes a cylinder 12 and a reciprocable shaft 14. FIG. 2 shows two captive ball and socket joints 20, one rigidly mounted on the end of link cylinder 12 and one mounted on the end of the link shaft 14, as by welding 16, or other suitable means.

Figure 3:
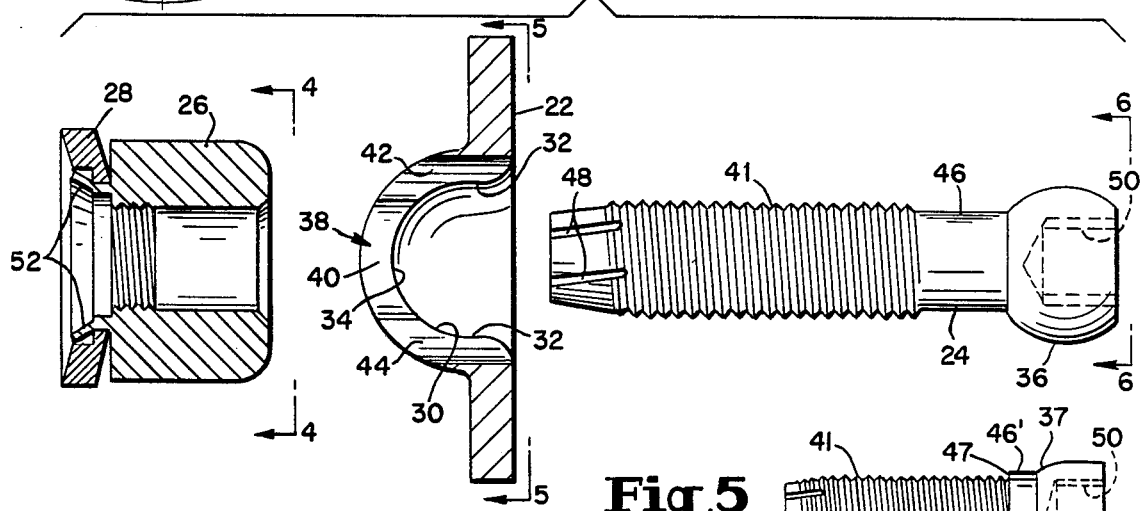
FIG. 3 is an enlarged scale, exploded plan view, partially sectioned of the units of a preferred captive ball and socket joint in accord with this invention.

The preferred ball and socket joint 20 includes a socket unit 22, a ball stud unit 24 and a bushing unit 26. In the preferred embodiment, bushing 26 is a hexagonal steel nut 26 to which a conical washer 28 is rotatably mounted. Socket unit 22 is made from flat sheet metal which can be of a thickness to be determined by the size and use of the joint. The parts in FIG. 3 are drawn to the same scale from an exemplary ball and socket joint and the thickness of the sheet metal (CRS 1008 or 1010) from which the socket lug was made was approximately 0.12 mm. If deemed desirable, the dimensions of the other parts can be determined from the scaled depictions.

Figure 5:
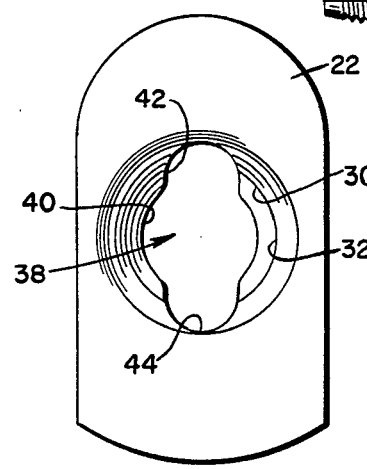
FIG. 5, is a plan view of the socket lug looking at its upper face as viewed from section line 5—5 in FIG. 3.
Figure 6:
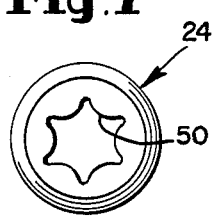
FIG. 6 is a top view of the ball head of the ball unit viewed from section line 6—6 in FIG. 3 and shows the drive recess shape made into the ball head.

Socket unit 22 can be mass-produced by stamping which can cut the lug shape of FIG. 5, pressure deform the socket recess 30 and pierce the aperture 32 in the recess 30 in a single pressure stamping operation. Recess 30 is made by forcing the sheet metal from one flat face into a protrusion which has a cylindrical wall 32 portion and a hemi-spherical bottom 34, the portions 32 and 34 being dimensioned with a radius to completely receive the partially spherical ball head 36, which will be referred to broadly as ball 36, of the ball stud 24 in the recess with a close free fit. During the same operation, or in a second step in the socket lug forming process, the socket recess is pierced to form the slotted aperture 38.

The aperture 38 through the socket recess 30 is shaped at its midpoint 40 with a diametral dimension enabling passage of a threaded shank 41 of the ball-stud 24. As seen in FIGS. 3 and 5 the slot aperture 38 extends longitudinally of the socket lug 22 into the spherical walls 34 and the cylindrical walls 32 of the socket recess 30 at 42 and 44. These extensions of the slot need not be as wide as the midpart and are to permit a swiveled movement of the ball unit in a longitudinal direction relative to the socket unit. Varying the width and length of the slot extensions will control the extent of longitudinal angular swivel movement and varying the diametral dimension of the mid portion 40 of the slot can permit more or less lateral relative swivel movement of the ball stud and socket if desired. The mid portion 40 of the slot must have at least a dimension enabling passage of the threaded portion of the ball stud 24, but not the ball head, for assembly purposes.

Figure 7:
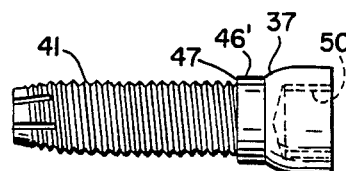
FIG. 7, is a small scale side view of an alternative embodiment of the ball unit in which the ball head is spherically contoured only at its base and includes a stepped cylindrical portion between the ball and the threads.
Figure 4:
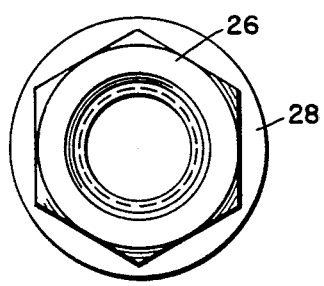
FIG. 4 is an end view of the nut assembly as viewed from the Section lines 4—4 in FIG. 3.

Ball stud 24 is a single unitary screw or bolt with a head end, shaped as a truncated portion of a spherical ball 36, and a threaded stud portion. Note, as shown in FIG. 7, at least the base portion 37 of the ball head 36' should be spherically contoured to seat in the spherical bottom 34 of the lug socket recess 30. The threads 41 terminate a spaced distance from the head 36 leaving a cylindrical portion 46 which in assembly is disposed with a free fit in the slotted aperture 38. The cylindrical portion 46, as shown in FIG. 3, has a smaller diameter than that of the threaded portion 41, but its diameter can be made larger if desired, as long as it is smaller than the diameter of the ball head 36. For example, portion 46 can be the same size as the O.D. of the threads or, as shown at 46' in FIG. 7, it can be made with a larger diameter than that of the threads, it being understood that the width of the slotted aperture 38 in the socket lug will be made larger to provide a free fit for the portion 46'. By making the aforesaid cylindrical portion 46' a larger diameter than the O.D. of the threads, a shoulder 47 is provided, against which the steel nut 26 can be seated and thereby located at a desired predetermined distance from the base of the ball portion 36. As shown the ball stud 24 is made for use in connecting automotive components and has provision of plural flutes 48 on the end of the threaded shank to provide thread cleaning and chasing of mating female threads in the mounting structure, e.g., an automobile frame or bracket component (not shown).

The ball head 36 is made with a "TORX" drive recess 50, which permits screwing of the ball stud by a rotary power driven tool (not shown). Provision for receiving such a tool by the ball head 36 can be other structure, such as screw driver kerfs, polygonal recesses or protrusions. In an event, the drive structure on the ball stud head will be completely accessible from the flat face side of the socket lug 22.

The bushing 26 could be a collar or other similar component rigidly located and fastened by crimping, welding or other known means to the ball stud 24, in a location as shown in FIG. 3, in order to make the ball captive in the socket. A preferable bushing is the steel nut 26 as depicted which is threaded onto the threaded shank of the ball stud after the stud is projected through the socket aperture 38. The nut serves as a bushing flange between the exterior surface of the socket recess 30 and the ball stud 24, and can determine the extent of swivel movement if desired. When properly located on the ball stud 24, the nut is rendered essentially rigid with the stud by Locktite thread cement or deformation or otherwise, and in effect the threaded ball stud can be screwed into another machine structure or component, e.g., automobile body, closure, lever, etc., by using a wrench on the hexagonal nut although access is not always convenient. As shown, nut 26 is made with a deformable sleeve 52 at one end. A special conical or bellville washer 28 is placed on the sleeve 52 which is then deformed to retain the washer 28 with freedom to rotate relative to the nut. When the combined ball stud and nut are screwed into an automobile part the washer is forced against and flattened against the automobile part by the nut to provide an effective high retention torque force retaining the ball stud to the mounting part.

The previously described joint 20 is adaptable for use in several ways. It can be preassembled as a subassembly, captive ball-in-socket joint consisting of the socket lug 22, ball headed stud 24 and a bushing 26. At any time, as needed, the subassembly can then be rigidly fastened to a machine element, e.g., bellcrank, link, etc., by suitable means such as welding the end of lug 22 to a part of the machine element. An alternate mounting of either or both lugs 22 can be angled relative to the spring centerline, as shown by the phantom line lug 22′ in FIG. 2, to accommodate mounting the spring unit on a support structure which is not necessarily parallel to the spring center line. Another way to mount the joint, which in certain assemblies might be preferable, is to first rigidly fasten the lug to the machine element, as by welding, and later on complete the assembly of the ball stud with the bushing or nut to render the ball captive in the socket lug. The later procedure is preferable when making an attachment of the connection to the shaft and/or cylinder of a gas spring because the simple flat socket lug can be welded on the gas spring components before they are assembled and will not interfere with procedures in automated assembly of the gas spring itself. Furthermore it is possible that where the end of a lever or like is to include the socket part of a captive ball in a socket arrangement, the lever, or lever arms of a bellcrank, could be stamped and shaped in the manner described for the sheet metal socket lug so that the socket component will be an integral part of a unitary sheet metal lever member.

The apertured base of the socket recess could be initially deformed so the walls are spread apart a distance sufficient for the ball stud to be inserted up through the apertured slot. The socket recess walls then swaged inwardly to form the slotted socket recess entrapping the ball. If assembled in such a manner, the ball and stud with retaining bushing, hexagonal or other shape, could be made as a single structurally integral part, and the captive ball and socket joint would then consist of but two elements.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A ball and socket joint for movably connecting two link components, comprising: a ball subassembly and a socket subassembly, said two subassemblies being assembled as said joint with said ball subassembly held captive in said socket subassembly; said ball subassembly including an elongate stud means including a ball post and a ball, at least the base portion of which has a spherically contoured surface, on one end of said stud means, means rigid on said stud means providing, at an axially fixed location intermediate the two ends of said stud means, a circumferential radially extended bushing flange, and a portion of said stud means adjacent its other end providing means for connection to a link component; and said socket subassembly comprising a single structurally integral apertured member made from a flat piece of sheet metal including a socket shaped portion loosely embracing said ball post and said base portion of said ball adjoining said post and disposed between said ball and said extended bushing flange, whereby said ball subassembly cannot be separated from said socket subassembly.

2. A ball and socket joint as defined in claim 1, wherein said portion of said stud means providing means for connection to a link component are screw threads.

3. A ball and socket joint as defined in claim 2 wherein a portion of said ball on the opposite side of and axially aligned with said elongate stud means includes an integral part enabling rotary drive cooperation with a rotary drive unit and the said socket subassembly, at least adjacent said ball, providing free access to said ball to permit placing of a driving portion of a rotary drive unit into cooperation with said integral part of said ball for turning said elongate stud means and screwing it into a structural linkage component while said ball subassembly is held captive in said socket subassembly.

4. A ball and socket joint as defined in claim 2 wherein a portion of said ball on the opposite side of and axially aligned with said elongate stud means being recessed with a recess providing a female wrench socket and the said socket subassembly, at least adjacent said ball recess, providing free access to said ball recess to permit insertion of a male wrench portion of a drive tool into said ball recess for turning said elongate stud means and screwing it into a structural link component while said ball subassembly is held captive in said socket subassembly.

5. A ball and socket joint as defined in claim 2 wherein said means on said stud means providing a circumferentially radially extended bushing flange is a nut threaded on said screw threads and rigidly secured in a predetermined axial location on said stud means.

6. A ball and socket joint as defined in claim 1, wherein said socket shaped portion of said socket subassembly is press formed deformation in said piece of flat sheet metal which has an essentially cylindrical shaped side wall with a bottom wall having hemi-spherical contours, said bottom wall and portions of said side wall being pierced with a slot shaped aperture dimensioned to permit angular rotation about the spherical center of said ball base portion, and a free fit passage of said stud means therethrough but preventing passage of said ball therethrough.

7. A ball and socket joint for movably connecting two link components, comprising: a ball subassembly and a socket subassembly, said two subassemblies being assembled as said joint with said ball subassembly held captive in said socket subassembly; said ball subassembly including an elongate stud means including a ball post and a ball, at least the base portion of which has a spherically contoured surface, on one end of said stud means, means on said stud means intermediate the two ends of said stud means providing a circumferential radially extended bushing flange, and a portion of said stud means adjacent its other end providing means consisting of screw threads for connection to a link component; said socket subassembly comprising a single structurally integral apertured member made from a flat piece of sheet metal including a socket shaped portion loosely embracing said ball post and said base portion of said ball adjoining said post and disposed between said ball and said extended bushing flange, whereby said ball subassembly cannot be separated from said socket subassembly; said means on said stud means providing a circumferentially radially extended bushing flange is a nut threaded on said screw threads and rigidly secured in a predetermined axial location on said stud means; and a washer is rotatably mounted on said nut on the face of the nut which is farthest away from said ball.

8. A ball and socket joint as defined in claim 7, wherein the depth of said socket shaped portion is greater than the dimension of said ball in an axial direction relative to the elongate stud means so that the ball is wholly disposed within said socket shaped portion.

9. A ball and socket joint comprising: a socket unit which is a structurally integral unit made from a single piece of flat sheet metal having a deformed intermediate portion, a depression forming a socket recess with a through aperture in the base of the recess; an integral ball and shank unit including a ball shaped head and an attachment shank; said ball and shank unit being disposed with its ball head in said socket recess with said attachment shank projected through said socket recess aperture; and means providing a radial abutment, larger than said aperture, being spaced-apart from said ball head and rigidly secured axially on and in substantially immovable relationship to the attachment shank on the opposite side of the socket recess from the ball head after the ball head is placed in the socket recess, to thereby render the ball and shank captive in said socket unit with sufficient clearance to permit relative swiveling movement of said ball and shank unit and said socket unit.

10. A ball and socket joint as defined in claim 9, wherein said attachment shank has screw threads thereon providing means for connection to a link component.

11. A ball and socket joint as defined in claim 10, wherein a portion of said ball on the opposite side of and axially aligned with said attachment shank includes an integral part enabling rotary drive cooperation with a rotary drive unit and the said socket unit at least adjacent said ball recess providing free access to said ball to permit placing of a driving portion of a rotary drive unit into cooperation with said integral part of said ball for turning said ball and shank unit and screwing it into a structural linkage component while said ball subassembly is held captive in said socket unit.

12. A ball and socket joint as defined in claim 10, wherein a portion of said ball on the opposite side of and axially aligned with said attachment shank being recessed with a recess providing a female wrench socket and the said socket unit, at least adjacent to said ball recess, providing free access to said ball recess to permit insertion of a male wrench portion of a drive tool into said ball recess for turning said ball and shank unit and screwing it into a structural link component while said ball and shank unit is held captive in said socket unit.

13. A ball and socket joint as defined in claim 10, wherein said means on said attachment shank is a nut threaded on said screw threads and rigidly secured in a predetermined axial location on said attachment shank.

14. A ball and socket joint as defined in claim 9, wherein said socket recess of said socket unit has an essentially cylindrical shaped side wall with a bottom wall having hemispherical contours, said bottom wall and portions of said side wall being pierced to provide said through aperture of slot-like shape dimensioned to permit a free fit passage of said stud means therethrough but preventing passage of said ball therethrough.

15. A ball and socket joint as defined in claim 13, wherein a portion of said one end of said stud means between said head and said thread has a smooth cylindrical surface, has a diameter smaller than that of the ball head and different than the O.D. of said screw threads, and has an axial dimension at least sufficient to provide a portion of said stud means between said ball head and said nut which will enable the necessary sufficient clearance to permit relative movement of said ball and shank unit and said socket unit.

16. A ball and socket joint comprising: a socket unit which is a structurally integral unit made from a single piece of flat sheet metal having a deformed intermediate portion, a depression forming a socket recess with a through aperture in the base of the recess; an integral ball and shank unit including a ball shaped head and an attachment shank having screw threads thereon providing means for connection to a link component; said ball and shank unit being disposed with its ball head in said socket recess with said shank projected through said socket recess aperture; means being spaced-apart from said ball head and rigidly secured on the attachment shank on the opposite side of the socket recess from the ball head after the ball head is placed in the socket recess, to thereby render the ball and shank unit captive in said socket unit with sufficient clearance to permit relative movement of said ball and shank unit and said socket unit; said means on said attachment shank being a nut threaded on said screw threads and rigidly secured in a predetermined axial location on said attachment shank; and a washer is rotatably mounted on said nut on the face of the nut which is farthest away from said ball.

17. A ball and socket joint as defined in claim 7 wherein a portion of said ball on the opposite side of the ball post and axially aligned with said elongate stud means includes an integral part enabling rotary drive cooperation with a rotary drive unit and the said socket subassembly, at least adjacent said ball, providing free access to said ball to permit placing of a driving portion of a rotary drive unit into cooperation with said integral part of said ball for turning said elongate stud means and screwing it into a structural linkage component while said ball subassembly is held captive in said socket subassembly.

18. A ball and socket joint as defined in claim 7 wherein a portion of said ball on the opposite side of the ball post and axially aligned with said elongate stud means being recessed with a recess providing a female wrench socket and the said socket subassembly, at least adjacent said ball recess, providing free access to said ball recess to permit insertion of a male wrench portion of a drive tool into said ball recess for turning said elongate stud means and screwing it into a structural link component while said ball subassembly is held captive in said socket subassembly.

* * * * *